US010556588B2

(12) United States Patent
Tamura (10) Patent No.: US 10,556,588 B2
(45) Date of Patent: Feb. 11, 2020

(54) VEHICLE TRAVELING CONTROL APPARATUS

(71) Applicant: SUBARU CORPORATION, Tokyo (JP)

(72) Inventor: Yuichiroh Tamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 240 days.

(21) Appl. No.: 15/667,136

(22) Filed: Aug. 2, 2017

(65) Prior Publication Data

US 2018/0065630 A1 Mar. 8, 2018

(30) Foreign Application Priority Data

Sep. 5, 2016 (JP) .................................. 2016-172752

(51) Int. Cl.
*B60W 30/16* (2012.01)
*G01C 21/34* (2006.01)
(Continued)

(52) U.S. Cl.
CPC ............ *B60W 30/16* (2013.01); *B60W 10/06* (2013.01); *B60W 10/10* (2013.01); *B60W 10/18* (2013.01);
(Continued)

(58) Field of Classification Search
CPC ............ B60W 30/16; B60W 2750/308; G01C 21/3407; G01C 21/26; G01C 21/34; G08G 1/22; G05D 1/0257; G05D 1/0246
See application file for complete search history.

(56) References Cited

U.S. PATENT DOCUMENTS 6,289,278 B1 * 9/2001 Endo .................. B60K 31/0008
701/431
10,293,826 B2 * 5/2019 Clarke ............ B60W 30/18163
(Continued)

FOREIGN PATENT DOCUMENTS

| JP | 2000-020896 A | 1/2000 |
| JP | 2003-200753 A | 7/2003 |
| JP | 2004-034917 A | 2/2004 |
| JP | 2011-006007 A | 1/2011 |

OTHER PUBLICATIONS

Office Action issued in corresponding Japanese Patent Application No. 2016-172752, dated Sep. 19, 2017.

*Primary Examiner* — Alan D Hutchinson
(74) *Attorney, Agent, or Firm* — McDermott Will & Emery LLP (57) ABSTRACT

A vehicle traveling control apparatus includes a determiner, a selector, and a switcher. The determiner determines a feature quantity of a third vehicle traveling ahead of a second vehicle for a plurality of targets present in front of the second vehicle traveling ahead of a first vehicle as an own vehicle when generating a target route and controlling a follow-up traveling of the first vehicle. The selector selects, among the plurality of targets, the third vehicle to be followed by the first vehicle based on a determination result of the feature quantity, when the second vehicle departs from a position in front of the first vehicle. The switcher switches the target route from a first target route generated based on a traveling trajectory of the second vehicle to a second target route generated based on a traveling trajectory of the third vehicle upon the departure of the second vehicle.

20 Claims, 8 Drawing Sheets

(51) Int. Cl.
*B60W 30/14* (2006.01)
*B60W 10/10* (2012.01)
*B60W 10/20* (2006.01)
*B60W 10/06* (2006.01)
*B60W 10/18* (2012.01)
*G01C 21/26* (2006.01)
*G05D 1/02* (2006.01)
*G08G 1/00* (2006.01)

(52) U.S. Cl.
CPC ............ *B60W 10/20* (2013.01); *B60W 30/14* (2013.01); *G01C 21/26* (2013.01); *G01C 21/34* (2013.01); *G01C 21/3407* (2013.01); *G05D 1/0246* (2013.01); *G05D 1/0257* (2013.01); *G08G 1/22* (2013.01); *B60W 2420/42* (2013.01); *B60W 2550/10* (2013.01); *B60W 2550/402* (2013.01); *B60W 2750/308* (2013.01)

(56) References Cited

U.S. PATENT DOCUMENTS

| | | | |
|---|---|---|---|
| 2001/0014846 A1* | 8/2001 | Sawamoto | B60K 31/0008 701/96 |
| 2002/0016663 A1* | 2/2002 | Nakamura | B60K 31/0008 701/96 |
| 2018/0015922 A1* | 1/2018 | McNew | B60W 30/165 |
| 2019/0139231 A1* | 5/2019 | Aizawa | G06T 7/248 |

* cited by examiner

VEHICLE TRAVELING CONTROL APPARATUS

CROSS-REFERENCE TO RELATED APPLICATIONS

The present application claims priority from Japanese Patent Application No. 2016-172752 filed on Sep. 5, 2016, the entire contents of which are hereby incorporated by reference.

BACKGROUND

The technology relates to a vehicle traveling control apparatus that generates a target route along which an own vehicle is to travel and controls follow-up traveling to follow the target route.

A follow-up traveling control for a vehicle such as an automobile has been known. In the follow-up traveling control, a traveling lane of an own vehicle and a preceding vehicle in front of the own vehicle are detected by means of a camera or a radar, for example. On the basis of the detections, an inter-vehicle distance from the own vehicle to the preceding vehicle is controlled; a position of the own vehicle within the traveling lane is controlled to a proper distance; and follow-up traveling to follow the target route is controlled using, as a trajectory, a middle position of a lane as well as a middle position of the preceding vehicle. In the follow-up traveling control, a steering angle is controlled to allow the position of the own vehicle to coincide with a control target point of the target route, and a traveling trajectory of the own vehicle is controlled to vary in following the target route.

For example, Japanese Unexamined Patent Application Publication (JP-A) No. 2000-20896 discloses a technique of performing a traveling control. In the technique of the traveling control, a traveling control is performed to follow a middle line of the lane when lane lines on a road are detectable, whereas a traveling control is performed to follow the middle position of the preceding vehicle when the lane lines are hidden by the preceding vehicle and thus undetectable. In JP-A No. 2000-20896, when it is determined from map information that there is a possibility that the preceding vehicle may turn right or left during the follow-up traveling to follow the preceding vehicle, a control gain is decreased. Further, the follow-up control is attenuated upon presumption of meandering from lateral positional variation of the preceding vehicle to thereby reduce inadequate behavioral variation in the own vehicle.

SUMMARY

Such a follow-up traveling control is generally requested to reduce a sense of discomfort that a driver may feel.

It is desirable to provide a vehicle traveling control apparatus that reduces a sense of discomfort that a driver may feel.

An aspect of the technology provides a vehicle traveling control apparatus that includes a determiner, a selector, and a switcher. The determiner is configured to determine, when generating a target route and controlling a follow-up traveling of a first vehicle, a feature quantity of a third vehicle traveling ahead of a second vehicle for a plurality of targets present in front of the second vehicle. The first vehicle is an own vehicle. The target route is a target route along which the first vehicle is to travel. The follow-up traveling is a traveling to follow the target route. The selector is configured to select, on a basis of a determination result of the feature quantity, the third vehicle among the plurality of targets when the second vehicle departs from a position in front of the first vehicle. The third vehicle serves as a target of the follow-up traveling performed by the first vehicle. The switcher is configured to switch the target route of the first vehicle from a first target route to a second target route when the second vehicle departs from the position in front of the first vehicle. The first target route is generated on a basis of a traveling trajectory of the second vehicle. The second target route is generated on a basis of a traveling trajectory of the third vehicle selected by the selector.

An aspect of the technology provides a vehicle traveling control apparatus that includes circuitry. The circuitry is configured to: determine, when generating a target route and controlling a follow-up traveling of a first vehicle, a feature quantity of a third vehicle traveling ahead of a second vehicle for a plurality of targets present in front of the second vehicle traveling ahead of the first vehicle, in which the first vehicle is an own vehicle, in which the target route is a target route along which the first vehicle is to travel, and in which the follow-up traveling is a traveling to follow the target route; select, on a basis of a determination result of the feature quantity, the third vehicle among the plurality of targets when the second vehicle departs from a position in front of the first vehicle, in which the third vehicle serves as a target of the follow-up traveling performed by the first vehicle; and switch the target route of the first vehicle from a first target route to a second target route when the second vehicle departs from the position in front of the first vehicle. The first target route is generated on a basis of a traveling trajectory of the second vehicle. The second target route is generated on a basis of a traveling trajectory of the third vehicle.

DETAILED DESCRIPTION

Figure 1:
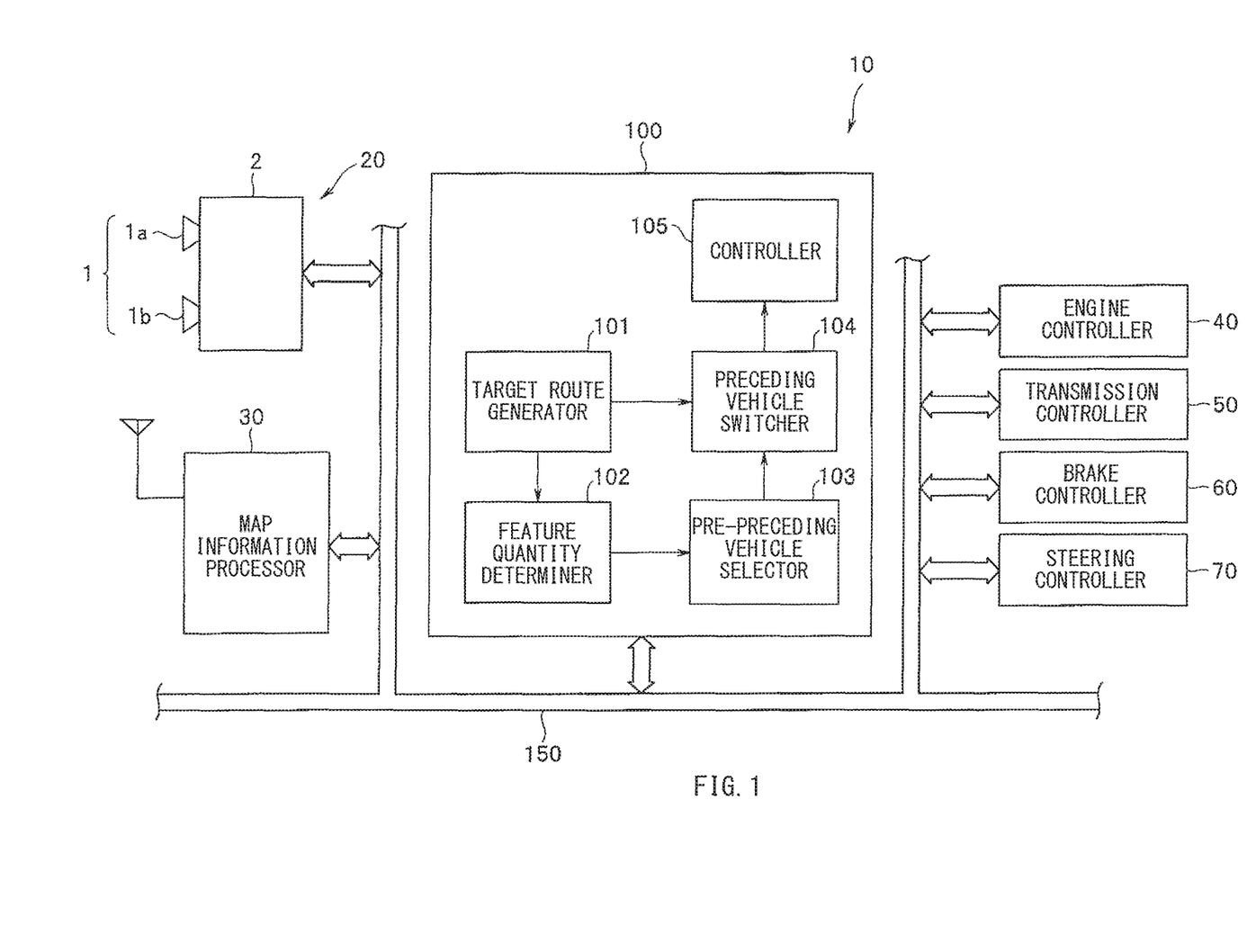
FIG. 1 illustrates an example of a configuration of a traveling control system according to an implementation of the technology.

Description is given below, with reference to the accompanying drawings, of some implementations of the technology. FIG. 1 illustrates a traveling control system 10 of a vehicle such as an automobile. The traveling control system performs a traveling control including autonomous automatic driving of the vehicle. The traveling control system 10 may include, for example, a traveling controller 100 as a central unit, an outside environment recognizer 20, a map information processor 30, an engine controller 40, a transmission controller 50, a brake controller 60, and a steering controller 70, which may be coupled to one another via a communication bus 150 that forms an intra-vehicle network.

The outside environment recognizer 20 may recognize an outside environment around an own vehicle using various devices such as, but not limited to, an on-vehicle camera, a millimeter-wave radar, and a laser radar, or light detection and ranging (LIDAR). In an implementation of the technology, as the outside environment recognizer 20, an on-vehicle camera 1 and an image recognizer 2 are adopted to mainly describe recognition of the outside environment by the on-vehicle camera 1 and the image recognizer 2.

In an implementation of the technology, the camera 1 may be a stereo camera including two cameras 1a and 1b that capture images of the same object from different perspectives. The cameras 1a and 1b may be shutter-synchronized cameras each including an imaging device such as a charge-coupled device (CCD) and a complementary metal oxide semiconductor (CMOS). The cameras 1a and 1b may be disposed with a predetermined base line length in vicinity of a rear-view mirror on inner side of a windshield, in an upper part of vehicle interior, for example.

A pair of right and left images captured by the camera 1 may be processed by the image recognizer 2. The image recognizer 2 may determine a pixel offset amount (parallax) between the right and left images at a corresponding position by a stereo matching processing, and may convert the pixel offset amount into data such as luminance data to generate a distance image. A point on the distance image may be coordinate-transformed, on principle of triangulation, to a point in a real space having an X-axis as a vehicle width direction, i.e., a right-left direction of the own vehicle; a Y-axis as a vehicle height direction; and a Z-axis as a vehicle length direction, i.e., a distance direction. Thus, lane lines on a road, e.g., white lines or any other colored lines along which the own vehicle is to travel, an obstacle, a vehicle traveling ahead of the own vehicle, or other objects may be three-dimensionally recognized.

The lane line on a road, such as the white line is recognizable by extracting, from the image, a group of points that may be a proposed lane line, and calculating a straight line or a curve that connects the proposed points. For example, in a lane line detection region set on the image, an edge may be detected whose luminance is varied by a predetermined value or more on a plurality of search lines set in a horizontal direction (vehicle width direction) to detect a set of a lane line start point and a lane line end point for each search line. Thus, a middle region between the lane line start point and the lane line end point may be extracted as a proposed lane line point.

Thereafter, time-series data of a spatial coordinate position of the proposed lane line point, based on the vehicle movement amount per unit time, may be obtained. The obtained time-series data may be processed to calculate a model approximate to the right lane line and the left lane line. This calculated model allows the lane line to be recognized. As the approximate model of the lane line, an approximate model of coupled linear components determined by Hough transform, an approximate model of a curve such as a quadratic, or any other suitable approximate model may be used.

The map information processor 30 may include a map database, and may measure a position of the own vehicle on the basis of a signal received from, for example but not limited to, a satellite for global positioning system (GPS) to collate the determined position of the own vehicle with map data. The map database may include the map data used to display a route guide for vehicle traveling as well as a current position of the vehicle. The map data may also include high-definition map data used to perform a drive assist control including automatic driving.

The map information processor 30 may propose to a driver a driving route guide and traffic information, via an unillustrated display, based on the collation between a measurement result of the position of the own vehicle and the map data. Further, the map information processor 30 may output road shape data of factors such as road curvature, lane width, and a road shoulder, as well as map information used for traveling control, such as a road azimuth angle, types of lane lines of the road, and the number of lanes.

The engine controller 40 may control a driving state of an unillustrated engine on the basis of signals from various sensors that detect the engine driving state and various pieces of control information transmitted via the communication bus 150. The engine controller 40 may perform an engine control on the basis of, for example but not limited to, intake air volume, throttle opening angle, engine water temperature, intake air temperature, air-fuel ratio, crank angle, accelerator position, and other vehicle information. Non-limiting examples of the principal engine control may include fuel injection control, ignition timing control, and control of the opening angle of an electronically-controlled throttle valve.

The transmission controller 50 may control oil pressure to be supplied to an unillustrated automatic transmission on the basis of signals received from sensors or on the basis of various pieces of control information. The sensors may detect a transmission position and a vehicle velocity, for example. The various pieces of control information may be transmitted via the communication bus 150. Thus, the transmission controller 50 may control the automatic transmission in accordance with preset transmission characteristics.

The brake controller 60 may control unillustrated brake devices of four wheels independently of a braking operation performed by a driver, on the basis of, for example but not limited to, a brake switch, wheel speed of each of the four wheels, a steering angle, a yaw rate, and other vehicle information. The brake controller 60 may also perform, for example, an antilock brake system and an antiskid control by calculating braking fluid pressure to be applied to each wheel on the basis of brake force of each wheel.

The steering controller 70 may control assist torque derived from an unillustrated electric power steering motor provided in a steering system of the vehicle, on the basis of, for example but not limited to, the vehicle velocity, the steering torque based on an input received from a driver, the steering angle, the yaw rate, and other vehicle information. The steering controller 70 may also perform, in accordance with an instruction from the traveling controller 100, driving control of the electric power steering motor with a steering amount that allows for following a traveling trajectory of the preceding vehicle, during follow-up traveling to follow the preceding vehicle traveling ahead of the own vehicle.

Description is given next of the traveling controller 100 as a central unit of the traveling control system 10. The traveling controller 100 may generate a target route that serves as a target of the follow-up traveling of the own vehicle on the basis of a recognition result of the outside environment made by the outside environment recognizer 20. The traveling controller 100 may also perform the traveling control via the engine controller 40, the transmission controller 50, the brake controller 60, and the steering controller 70 to allow for traveling along the target route.

To be more specific, when the lane lines of the road are stably recognized, the traveling controller 100 may control the own vehicle to follow the target route having as a trajectory a middle position between the right lane line and the left lane line. In contrast, in a case where there is no lane line or a lane line is not recognizable, with a preceding vehicle being captured ahead of the own vehicle, the traveling controller 100 may control the own vehicle to follow the target route generated on the basis of the traveling trajectory of the preceding vehicle.

Moreover, in a case where the own vehicle travels while following the preceding vehicle in a circumstance such as a traffic jam where the lane lines of the road are unrecognizable due to a close distance with respect to the preceding vehicle, the traveling controller 100 may prevent deviation from the original operation of the system even when the preceding vehicle changes lanes, thus avoiding a situation where the own vehicle drifts away from the original advancing direction while tracking the preceding vehicle. In other words, in a situation where the preceding vehicle changes lanes, a pre-preceding vehicle in front of the preceding vehicle may be detected due to departure of the preceding vehicle from the current lane. Accordingly, the traveling controller 100 may switch the target of the follow-up traveling from the preceding vehicle to the pre-preceding vehicle at an appropriate timing using function parts illustrated in FIG. 1, i.e., a target route generator 101, a feature quantity determiner 102, a pre-preceding vehicle selector 103, a preceding vehicle switcher 104, and a controller 105.

The target route generator 101 may perform processings of generating target routes in a parallel manner. Non-limiting examples of the target routes to be generated may include a target route based on the lane lines, a target route based on the traveling trajectory of the preceding vehicle in front of the own vehicle, and a target route based on a traveling trajectory of the pre-preceding vehicle that is recognized in front of the preceding vehicle. These target routes may be each generated as a trajectory of a target point of the follow-up traveling basically in accordance with the similar processing.

In other words, the target route based on the lane lines may be generated as the trajectory of a target point which is set using the middle position between the right lane line and the left lane line. The target route based on the preceding vehicle may be generated as the trajectory of a target point which is set using the middle position in a width direction of a rear surface region of the preceding vehicle. The target route based on the pre-preceding vehicle may be initially generated using the middle position in a width direction of a rear surface region of the pre-preceding vehicle that is partially recognizable. The target route based on the pre-preceding vehicle may be finally a trajectory of the middle position in a width direction of an entire rear surface region of the pre-preceding vehicle, in a state where the target of the follow-up traveling is switched from the preceding vehicle to the pre-preceding vehicle due to the departure of the preceding vehicle.

Description is given of an example of generating the target route by expressing the trajectory of the target point with a quadratic curve according to an implementation of the technology.

[(a) Case of Lane Line]

Lane line proposed points detected on an image for image coordinate systems may be mapped onto respective coordinate systems in a real space. The lane line proposed points on the image may be, for example, proposed points located at about 7 to about 8 meters on near side to about 100 meters on distant side; all of the lane line proposed points may be mapped onto the real space. Thereafter, the lane line proposed points detected on the image may be collated with past lane line data estimated on the basis of a movement amount of the own vehicle to identify an approximate curve for each of the proposed points.

[(b) Case of Preceding Vehicle (Pre-Preceding Vehicle)]

A coordinate of the middle in the rear surface of the preceding vehicle, or the pre-preceding vehicle, may be set as a point P, and the point P may be updated momentarily on the basis of the later-described expressions (1) to (4) by a movement amount of the own vehicle, thus allowing for preparation of a group of trajectory points of the preceding vehicle, or the pre-preceding vehicle. An approximate curve may be identified for the group of trajectory points.

Figure 2:
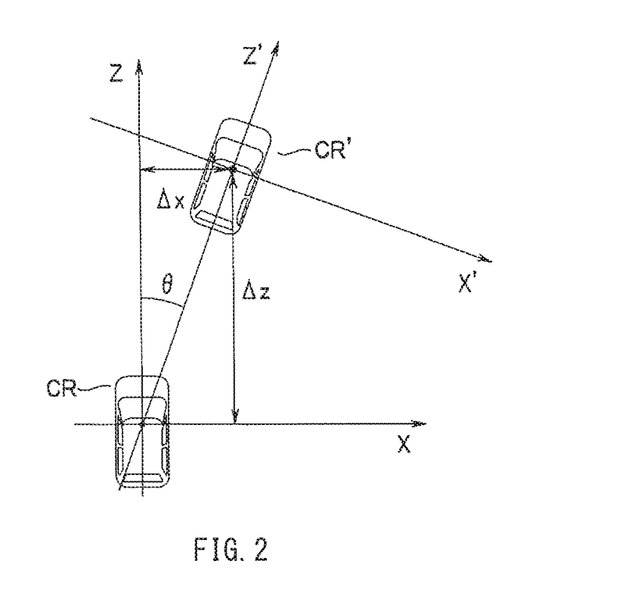
FIG. 2 describes an example of a vehicle movement amount.

In one more specific but non-limiting example, for example, the proposed point P as a target for each frame may be determined on the basis of the movement amount of the own vehicle per frame of an image captured by the camera 1, and a curve that approximates the group of points for the proposed point P may be calculated as the target route. To be more specific, from a relationship illustrated in FIG. 2, on the basis of vehicle velocity V of an own vehicle CR and a yaw angle θ determined by a yaw rate of the own vehicle CR, movement amounts Δx and Δz toward the own vehicle CR' at a frame rate Δt (i.e., a period of time until the captured image is updated by one frame) may be calculated using the following expressions (1) and (2).

$$\Delta x = V \cdot \Delta t \cdot \sin \theta \quad (1)$$

$$\Delta z = V \cdot \Delta t \cdot \cos \theta \quad (2)$$

Thereafter, the movement amounts Δx and Δz of the own vehicle may be subtracted from proposed points Pold (Xold, Zold), which are detected prior to a previous frame, in a vehicle fixed coordinate system (X, Y). Thereafter, coordinate transformation to a vehicle fixed coordinate system (X', Z') in a current frame may be performed to calculate coordinates of proposed points Ppre (Xpre, Zpre) in the current frame, as represented by the following expressions (3) and (4).

$$X\text{pre} = (X\text{old} \cdot \Delta x) \cdot \cos \theta - (Z\text{old} \cdot \Delta z) \cdot \sin \theta \quad (3)$$

$$Z\text{pre} = (X\text{old} \cdot \Delta x) \cdot \sin \theta + (Z\text{old} \cdot \Delta z) \cdot \cos \theta \quad (4)$$

Figure 3:
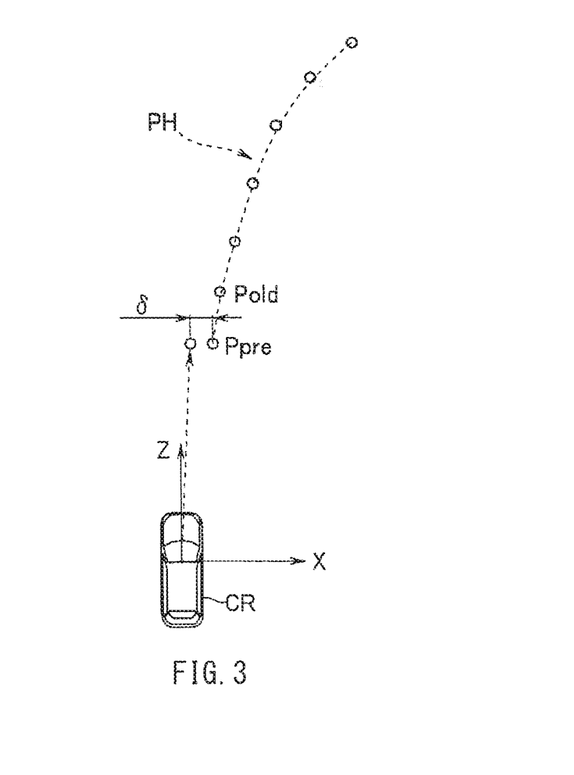
FIG. 3 describes an example of a trajectory of a control target point.

Thereafter, for example, least-square method may be applied to the group of proposed points to determine a route PH in which the trajectory of the proposed points is expressed by a quadratic curve, as represented by the following expression (5), to set the route PH as the target route, as illustrated in FIG. 3.

$$X = A \cdot Z^2 + B \cdot Z + C \quad (5)$$

In the expression (5), coefficients A, B, and C denote route components that constitute the target route. The coefficient A denotes a curvature component of the target route. The coefficient B denotes a yaw angle component of the target route with respect to the own vehicle, i.e., an angle component between a longitudinal direction axis of the own vehicle and the target route (tangent). The coefficient C denotes a lateral-directional position component (lateral position component) of the target route with respect to the own vehicle.

Note that, as for the target route using the lane lines, the middle position between the proposed points of each of the right lane line and the left lane line may be used as the target point to calculate the above-mentioned expression (5) from the middle target point. More accurately, however, the curve of the expression (5) may be calculated for each of the right lane line and the left lane line to set, as the target route, the trajectory of the middle position determined by the right and left curves.

The feature quantity determiner 102 may use, as a target, a three-dimensional object present in front of the preceding vehicle to determine whether the target satisfies a condition as the pre-preceding vehicle, on the basis of feature quantities described below in (E1-1) to (E1-3). The determination of the feature quantities of the pre-preceding vehicle may be performed on each target from information of images of a plurality of targets present in front of the preceding vehicle. The feature quantities of (E1-1) to (E1-3) may be compared with respective threshold values for each target to allow for separate determination as to whether each target satisfies the condition as the pre-preceding vehicle.

In an implementation of the technology, each of the feature quantities including a symbol may be calculated. When the feature quantities exceed the respective threshold values, the condition as the pre-preceding vehicle may be partially satisfied. A determination result of each of the feature quantities may be held at a counter for each of the feature quantities. Counters that hold the determination results of (E1-1) to (E1-3) are hereinafter referred to, respectively, as an on-yaw-advancing-route presence counter, a presence-distance condition counter, and a velocity condition counter.

[(E1-1) Lateral Position Deviation of Target with Respect to Yaw Advancing Route of Own Vehicle]

Figure 4:
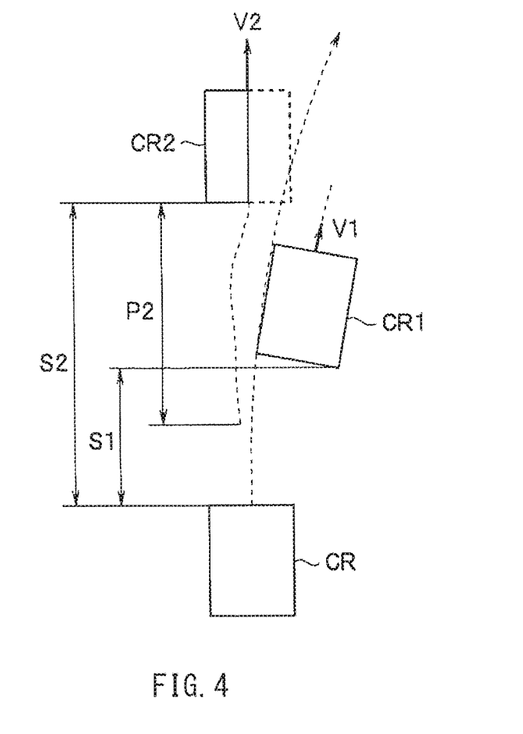
FIG. 4 describes an example of trajectories of a preceding vehicle and a pre-preceding vehicle.

When a preceding vehicle CR1 departs from a current traveling lane due to lane change, for example, as illustrated in FIG. 4, the yaw angle component of the target route based on the preceding vehicle CR1 may be reflected in an advancing direction of the own vehicle CR, and a target CR2 in front of the preceding vehicle CR1 may enter a visual field of the camera of the own vehicle.

Accordingly, the feature quantity determiner 102 may detect, as the feature quantity, lateral position deviation of the target CR2 with respect to a yaw advancing route based on a yaw angle component A of the own vehicle, for each frame, to compare the detected lateral position deviation with a certain threshold value. The threshold value may be a value that allows for determination as to whether there is any target as the pre-preceding vehicle on the yaw advancing route of the own vehicle. When the lateral position deviation of the target exceeds the threshold value, the on-yaw-advancing-route presence counter may be incremented. When the lateral position deviation falls below the threshold value, the on-yaw-advancing-route presence counter may be decremented.

[(E1-2) Distance to Preceding Vehicle and to Target]

A distance S1 from the own vehicle CR to the preceding vehicle CR1 and a distance S2 from the own vehicle CR to the target CR2 may be detected for each frame, and determination may be made as to whether there is any target as the pre-preceding vehicle in a range of the follow-up traveling of the own vehicle, on the basis of determination as to whether ranges of the distances S1 and S2 exceed corresponding threshold values. When the distance range exceeds the threshold value, the presence-distance condition counter may be incremented. When the distance range falls below the threshold value, the presence-distance condition counter may be decremented.

[(E1-3) Velocity of Preceding Vehicle and of Target]

Velocity V1 of the preceding vehicle CR1 relative to the own vehicle CR, velocity V2 of the target CR2 relative to the own vehicle CR, and a velocity difference between the preceding vehicle CR1 and the target CR2 (V2−V1) may be detected for each frame. Thereafter, determination may be made as to whether the target is a moving object to be the target of the follow-up traveling as the pre-preceding vehicle, on the basis of determination as to whether these velocity ranges exceed corresponding threshold values. When the velocity range exceeds the threshold value, the velocity condition counter may be incremented. When the velocity range falls below the threshold value, the velocity condition counter may be decremented.

Furthermore, in an implementation of the technology, a feature quantity described below in (E1-4) may be added to the above-described (E1-1) to (E1-3). Note that the feature quantity of (E1-4) is not necessarily an essential condition, and may be omitted.

[(E1-4) Trajectory Length of Target]

As for the target CR2 present in front of the preceding vehicle CR1, a length P2 of a trajectory (movement trajectory) of the target CR2 may be detected as the feature quantity for each frame, thereby allowing for determination as to whether the target is the moving object. When a variation in the trajectory length of the target for each frame exceeds a threshold value, a counter, i.e., a trajectory length condition counter may be incremented. When the variation in the trajectory length of the target for each frame falls below the threshold value, the trajectory length condition counter may be decremented.

The pre-preceding vehicle selector 103 may check the counters, i.e., the on-yaw-advancing-route presence counter, the presence-distance condition counter, and the velocity condition counter of the feature quantity determiner 102 to choose, as a candidate of the pre-preceding vehicle, a target in which all of the counters exceed the respective threshold values set for the counters. The chosen target, i.e., the candidate of the pre-preceding vehicle may be subjected to evaluations described below in (E2-1) to (E2-3). By performing the evaluations, a target having the highest evaluation value is selected as the pre-preceding vehicle that serves as the target to be followed by the own vehicle due to the departure of the preceding vehicle.

[(E2-1) Lateral Position of Target]

In order to determine whether there is any target within the lane of the own vehicle, the lateral position of the target may be evaluated from the lane information, as evaluation of the position where the target is present. For example, the evaluation value may be set higher as the lateral position of the target comes closer to the middle position of the lane, whereas a target that departs from the lane may be excluded as an unacceptable target from the selection target.

[(E2-2) Lateral Position Deviation of Trajectory of Target]

Likewise, lateral position deviation of the trajectory of the target may be evaluated as the evaluation of the position where the target is present. For example, the evaluation value may be set higher as the lateral position deviation of the trajectory of the target comes closer to the middle position of the lane, whereas a target that departs from the lane may be excluded as the unacceptable target from the selection target in the same manner.

[(E2-3) Width of Target that Appears]

A width of the pre-preceding vehicle that begins to be seen as a result of the departure of the preceding vehicle may be narrow at a time when the pre-preceding vehicle begins to be seen. Therefore, in order to determine whether the target is the pre-preceding vehicle, the width of the target may be evaluated. When the width of the target is a width equal to or greater than a preset value at an initial detection of the target, the target may be excluded as the unacceptable target from the selection target.

Furthermore, when a new target appears that may possibly be the candidate of the pre-preceding vehicle in a state where the target is already selected as the pre-preceding vehicle, the pre-preceding vehicle selector 103 may perform evaluations of the following (E2-4) and (E2-5), and may switch the currently selected pre-preceding vehicle to a new target when determination results based on these evaluations both fall under "YES".

[(E2-4) Distance from Own Vehicle to Target]

A distance from the own vehicle to the new target may be evaluated, and determination may be made as to whether the new target is closer to the own vehicle than the selected target.

[(E2-5) Lateral Position of Target]

A lateral position of the new target may be evaluated, and determination may be made as to whether the new target is closer to the advancing route of the preceding vehicle than the selected target.

Note that, when the target selected as the pre-preceding vehicle is no recognized (or is lost) due to a reason such as hiding of the target selected as the pre-preceding vehicle by an image of the preceding vehicle, for example, the pre-preceding vehicle selector 103 may cancel the selection of the lost target as the pre-preceding vehicle.

The preceding vehicle switcher 104 may switch the target of the follow-up traveling of the own vehicle from the current preceding vehicle to the target selected by the pre-preceding vehicle selector 103 to gradually move the target point of the follow-up traveling from the preceding vehicle toward the pre-preceding vehicle, i.e., the selected target. In one more specific but non-limiting example, a lateral position component C may be varied gradually, with respect to the current target route, from the middle position in the width direction of the rear surface region of the preceding vehicle toward the middle position in the width direction of the rear surface region of the pre-preceding vehicle. Further, as for a curvature component A and a yaw angle component B as well, the component of the target route based on the traveling trajectory of the preceding vehicle may be gradually varied toward the component of the target route based on the traveling trajectory of the pre-preceding vehicle.

Note that, when there is no target any more that may possibly be selected as the pre-preceding vehicle during the above-described control where the target route is varied, the target point of the follow-up traveling may be returned gradually from the position under the control at this time to the original target route based on the preceding vehicle.

The controller 105 may correct a current steering angle of the own vehicle by means of the steering controller 70 so as to allow the middle position in the vehicle width direction of the own vehicle to coincide with the target point on the target route, thereby controlling the follow-up traveling to follow the target route. The steering control for the control target point may be performed mainly using a feedback control for deviation 8 (see FIG. 2) between the target point and an estimated lateral position of the own vehicle at a predetermined distance when advancing at the current steering angle. The steering control for the control target point may also be performed using a feedback control for a relative yaw angle between the target route and the own vehicle, and a feedforward control for the curvature of the target route.

Note that it is possible to calculate the estimated lateral position of the own vehicle at the predetermined distance using, for example, the steering angle, the vehicle velocity, a vehicle-specific stability factor, a wheelbase, and a steering gear ratio. Alternatively, it is also possible to calculate the estimated lateral position of the own vehicle at the predetermined distance using a yaw rate of the own vehicle detected with a sensor.

For example, a steering control amount of the feedforward control for the curvature component A of the target route, a steering control amount of the feedback control for a relative yaw angle $\theta y$ between the target route and the own vehicle based on the yaw angle component B of the target route, and a steering control amount of the feedback control for the deviation $\delta$ between the target point and the estimated lateral position of the own vehicle based on the lateral position component C of the target route may be added to calculate a target steering angle $\alpha$ref. The calculated target steering angle $\alpha$ref may be outputted to the steering controller 70, as represented by the following expression (9):

$$\alpha ref = Gff \cdot A + Gy \cdot \theta y + Gf \cdot \delta \quad (9)$$

where

Gff denotes a feedforward gain for the curvature component A of the target route, Gy denotes a feedback gain for the relative yaw angle $\theta y$ between the target route and the own vehicle, and Gf denotes a feedback gain for the lateral position deviation 6 between the target route and the own vehicle when advancing at the current steering angle.

The steering controller 70 may perform an arithmetic operation that calculates target steering torque on the basis of deviation between the target steering angle $\alpha$ref and an actual steering angle to control the electric power steering motor. The control of the electric power steering motor to have the calculated target steering torque may be performed specifically as an electric current control of the electric power steering motor. For example, the electric power steering motor may be driven by a drive current under proportional-integral-derivative (PID) control.

Figure 5:
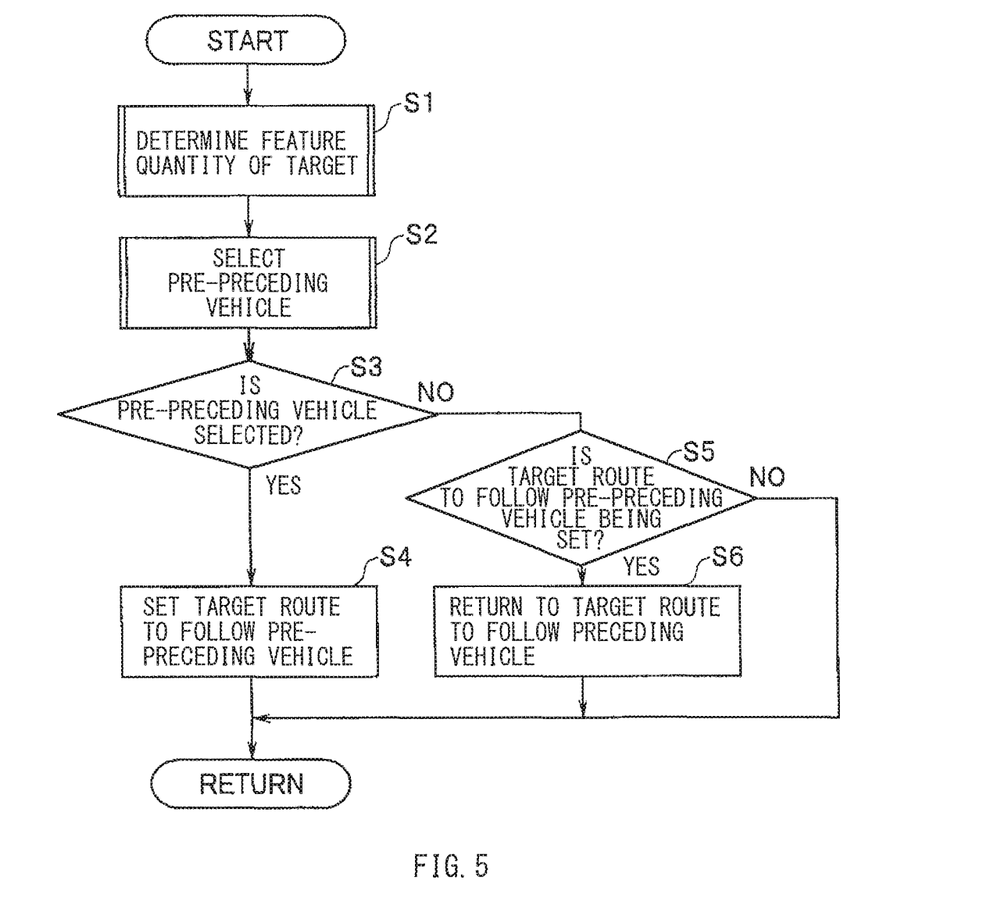
FIG. 5 is a flowchart of an example of a main processing of a follow-up traveling control.
Figure 6:
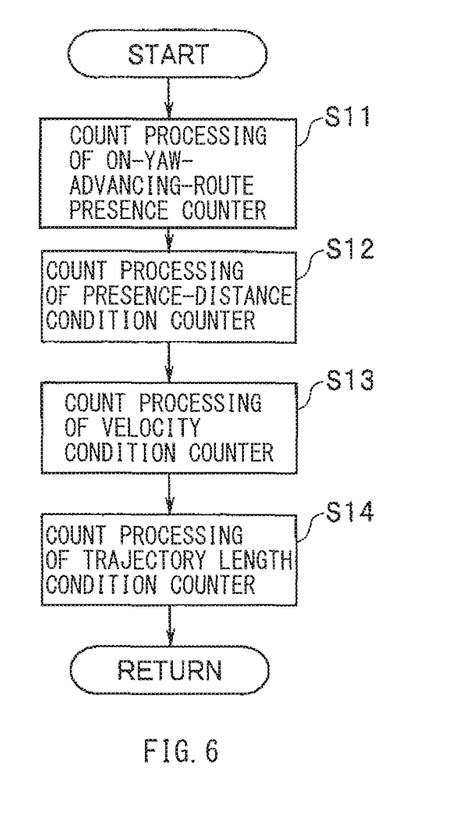
FIG. 6 is a flowchart of an example of a count processing of target feature quantity determination.
Figure 7:
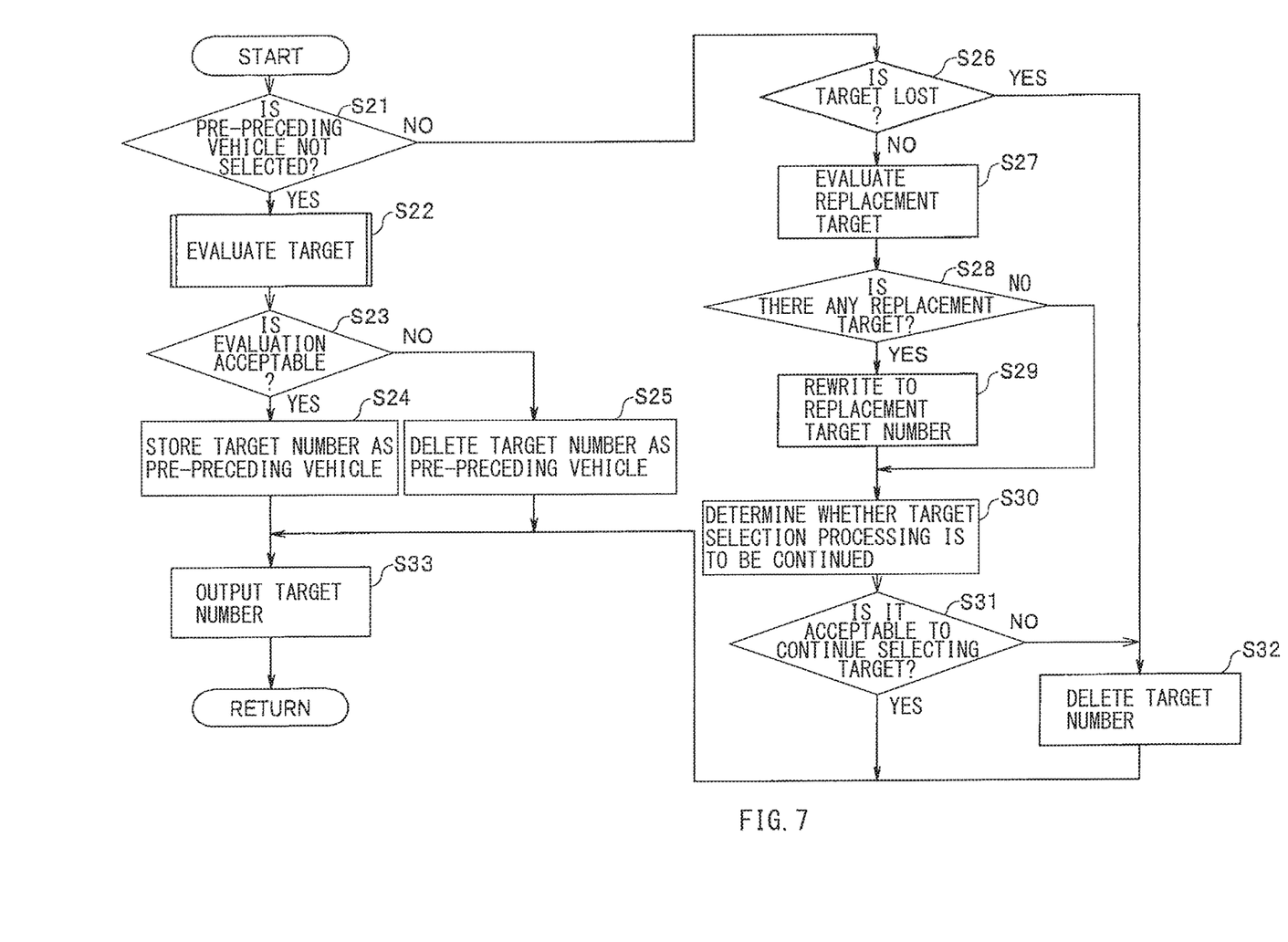
FIG. 7 is a flowchart of an example of a pre-preceding vehicle selection processing.
Figure 8:
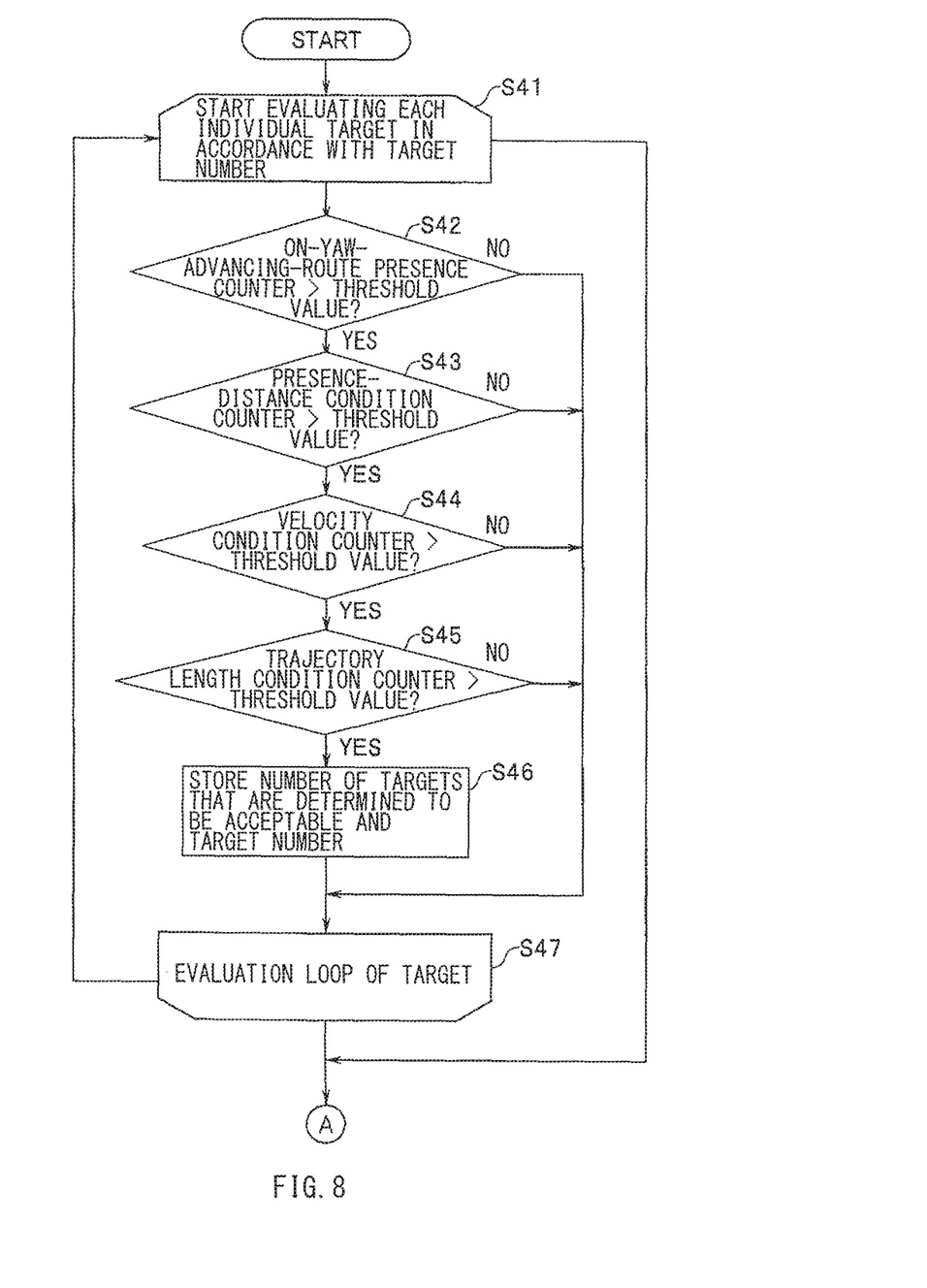
FIG. 8 is a flowchart of an example of a target evaluation processing.
Figure 9:
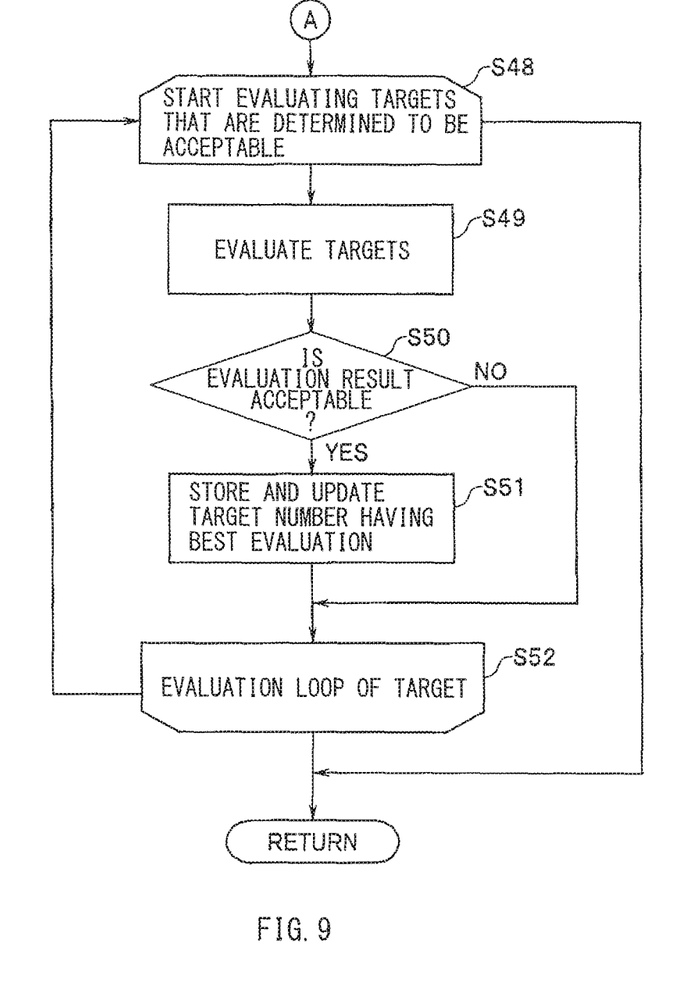
FIG. 9 is a flowchart of an example of a target evaluation processing subsequent to the processing in FIG. 8.

Description is given next of a program processing of the follow-up traveling control performed in the traveling controller 100, with reference to flowcharts in FIGS. 5 to 9. FIG. 5 illustrates an example of a main processing of the follow-up traveling control. FIG. 6 illustrates an example of a count processing of target feature quantity determination. FIG. 7 illustrates an example of a pre-preceding vehicle selection processing. FIGS. 8 and 9 each illustrate an example of a target evaluation processing.

Description is given first of a main processing of the follow-up traveling control in FIG. 5. In first step S1, the feature quantity of the target present in front of the preceding vehicle may be determined, as a processing of the feature quantity determiner 102 in the main processing of the follow-up traveling control. To be more specific, the processing in step S1 may be performed as the count processing of the target feature quantity determination illustrated in FIG. 6.

In other words, in step S11 of FIG. 6, the count processing of the on-yaw-advancing-route presence counter may be performed. The on-yaw-advancing-route presence counter may determine the lateral position deviation of the target with respect to the yaw advancing route of the own vehicle. In step S12, the count processing of the presence-distance condition counter may be performed. The presence-distance condition counter may determine the distance range from the own vehicle to each of the target and the preceding vehicle. Further, in step S13, the count processing of the velocity condition counter may be performed. The velocity condition counter may determine the velocity ranges of the preceding vehicle and the target. In step S14, the count processing of the trajectory length condition counter may be performed. The trajectory length condition counter may determine the trajectory length of the target.

Thereafter, in step S2 of the main processing, a pre-preceding vehicle selection processing illustrated in FIG. 7 may be performed, as a processing of the pre-preceding vehicle selector 103. In this pre-preceding vehicle selection processing, the on-yaw-advancing-route presence counter, the presence-distance condition counter, the velocity condition counter, and the trajectory length condition counter may be used to choose the candidates of the pre-preceding vehicle among the plurality of targets. Further, the chosen candidates of the pre-preceding vehicle may be evaluated, and a target having the highest evaluation value may be selected as the pre-preceding vehicle. The pre-preceding vehicle selection processing is described later.

Thereafter, the flow may move from step S2 to step S3, in which whether a target is selected as the pre-preceding vehicle may be checked. When there is a target selected as the pre-preceding vehicle, the flow may proceed from step S3 to step S4. In step S4, a processing of the preceding vehicle switcher 104 may be performed, and the target route to follow the pre-preceding vehicle may be set in place of the current target route, to allow the target route to be gradually varied.

In contrast, when there is no target any more that is selected as the pre-preceding vehicle, the flow may proceed from step S3 to step S5, in which whether the target route to follow the pre-preceding vehicle is being set may be checked. When the target route to follow the pre-preceding vehicle is not being set, the flow may exit the main processing as it is. When the target route to follow the pre-preceding vehicle is being set, a processing may be performed, in step S6, that allows the follow-up traveling to return to the target route to follow the preceding vehicle.

Description is given next of the pre-preceding vehicle selection processing in FIG. 7. The pre-preceding vehicle selection processing may first check, in step S21, whether a target is not selected as the pre-preceding vehicle. When the target is not selected, a processing may be performed that selects the target as the pre-preceding vehicle in step S22 or a step subsequent thereto. When the target is already selected as the pre-preceding vehicle, a processing in a case of losing a target may be performed in step S26 or a step subsequent thereto.

When the pre-preceding vehicle is not selected, the target evaluation processing in FIGS. 8 and 9 may be performed in step S22. In this target evaluation processing, the candidates of the pre-preceding vehicle may be chosen among all of the targets through a loop processing of steps S41 to S47, and the chosen candidates of the pre-preceding vehicle may be evaluated through a loop processing of steps S48 to S52.

To be more specific, evaluation may be started for each individual target in accordance with target numbers assigned to respective targets in step S41. In steps S42, S43, S44, and S45, determination may be made for each of the targets as to whether the counters of the above-described feature quantities of (E1-1) to (E1-4), i.e., the on-yaw-advancing-route presence counter, the presence-distance condition counter, the velocity condition counter, and the trajectory length condition counter exceed the threshold values set for the respective counters. In step S46, the number of targets that are determined to be acceptable with all of the counters exceeding the respective threshold values and the target numbers are stored. In step S47, whether evaluations of all of the targets are completed may be checked, and the processing may be continued until completion of the evaluations of all of the targets.

Note that, in this case, it is also possible to omit the determination based on the feature quantity of the trajectory length of the target in step S45, as described above.

Thereafter, when the evaluations of all of the targets through the counter determination are completed, evaluations of the targets that are determined to be acceptable in the counter determination in step S48 may be started. In step S49, evaluations may be made of the above-described targets (E2-1) to (E2-3), i.e., of the lateral position of the target, the lateral position deviation of the trajectory of the target, and the width of the target. In step S50, whether the evaluation result is acceptable may be checked, and targets having an unacceptable evaluation result may be excluded from the selection target. Thereafter, the flow may proceed to step S51.

In step S51, a target number having the acceptable evaluation result as well as the best evaluation, i.e., the highest evaluation value at present may be stored and updated. In step S52, whether evaluations are completed may be checked for all of the targets, and the processing may be continued until completion of the evaluations of all of the targets.

After the completion of the target evaluation processing in step S22 of the above-described pre-preceding vehicle selection processing, the flow may proceed to step S23, in which whether behaviors of the target and the preceding vehicle are acceptable may be checked. In one more specific but non-limiting example, evaluation may be made as to whether there is another target that overlaps a rear of the target. When there is no other target behind the target, determination may be made that the evaluation is acceptable.

In step S24, a target number of the target having the best final evaluation may be stored as the pre-preceding vehicle. Thereafter, the flow may proceed from step S24 to step S33, in which the target number may be outputted. The target number that is output here may be used to specify the pre-preceding vehicle to be followed by the own vehicle.

In contrast, when there is another target that overlaps the rear of the target, determination may be made that the evaluation is unacceptable. Thereafter, in step S25, the relevant target number may be deleted and excluded from the selection target as the pre-preceding vehicle. In step S33, the deleted target number may be outputted. The target number that is output at this time may be set as a target number, e.g., "0" (zero) that indicates no presence of the pre-preceding vehicle to be followed.

Description is given next of a processing in step S26 or a step subsequent thereto in a case where the target is already selected as the pre-preceding vehicle in step S21. In step S26, whether the target is lost may be checked. When the target is lost, the flow may jump from step S26 to step S32, in which a target number of the relevant target may be deleted. In step S33, the deleted target number may be outputted.

In contrast, when the target is not lost, the flow may proceed from step S26 to step S27, in which an evaluation processing may be performed for another new target, i.e., a replacement target that is possible to be switched from the current target selected as the pre-preceding vehicle. The processing in step S27 may be a processing that may include the evaluations of the distance and the lateral position described above, respectively, in (E2-4) and (E2-5).

Thereafter, the flow may proceed to step S28, in which determination may be made as to whether there is any replacement target to replace the current target as the pre-preceding vehicle. When the new target is closer to the own vehicle and is closer to the advancing route of the preceding vehicle than the currently selected target as a result of the evaluation of the replacement target, determination may be made in step S28 that there is a replacement target. Thereafter, in step S29, a target number of the target that is currently selected as the pre-preceding vehicle may be rewritten to a target number of the replacement target.

Thereafter, the flow may proceed from step S29 to step S30, in which determination may be made as to whether the target selection processing is to be continued against a variation in a traveling environment. In one more specific but non-limiting example, it may be checked, from the trajectory of the preceding vehicle, whether the preceding vehicle moves linearly. When determination is made that the preceding vehicle departs by changing lanes without moving linearly, determination may be made in step S31 that it is acceptable to continue selecting the target, and the target number may be outputted in step S33.

In contrast, when it is presumed that there is no departure with the preceding vehicle moving linearly, determination may be made that it is not possible to continue selecting the target. Thereafter, the flow may proceed from step S31 to step S32, in which a target number of the selected target may be deleted, and the deleted target number may be outputted in step S33.

As described above, according to the implementation of the technology, the feature quantities of the pre-preceding vehicle are determined for the plurality of targets present in front of the preceding vehicle. On the basis of the determination result, the pre-preceding vehicle is selected which serves as the target of the follow-up traveling when the preceding vehicle departs by changing lanes, for example. This makes it possible to prevent deviation from the original operation of the system even when the preceding vehicle changes lanes, for example, to depart from a position in front of the own vehicle, thus allowing for reduction in sense of discomfort that a driver may feel.

Incidentally, for example, in a case where a possibility that the preceding vehicle may turn right or left is determined from the map information during the follow-up traveling to follow the preceding vehicle (comparative example), it is difficult, from the map information, to address a circumstance in which, for example, the preceding vehicle changes lanes to depart from the position in front of the own vehicle in a road such as an expressway. In other words, in a case of using the method of the comparative example, when the preceding vehicle changes lanes in such a circumstance, the own vehicle follows the preceding vehicle to drift in a direction away from the lane in its behavior despite the intention of a driver who drives the own vehicle. This behavior may cause deviation from the original operation of the system, thus resulting in giving an increased sense of discomfort to the driver.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle traveling control apparatus comprising:
  a determiner configured to, while a first vehicle that is an own vehicle travels along a first target route generated based on a traveling trajectory of a second vehicle traveling directly in front of the first vehicle, determine an evaluation value for each of objects present ahead of the second vehicle based at least on 1) a position where each of the objects is present and 2) a width of each of the objects;
  a selector configured to, in response to detecting the second vehicle departing from a position directly in front of the first vehicle, identify a third vehicle among the objects ahead of the second vehicle based on the evaluation value for each of the objects;
  a target route controller configured to generate a second target route based on a travel trajectory of the identified third vehicle; and
  a switcher configured to switch from the first target route generated based on the travel trajectory of the second vehicle to the second target route to allow the first vehicle to travel along the second target route generated based on the travel trajectory of the third vehicle.

2. The vehicle traveling control apparatus according to claim 1, wherein
  the determiner detects a feature quantity for each of the targets, and
  the determiner determines whether the feature quantity for each of the objects ahead of the second vehicle satisfies a condition that corresponds to the third vehicle.

3. The vehicle traveling control apparatus according to claim 2, wherein the determiner detects, as the feature quantity for each of the objects ahead of the second vehicle, at least
  a lateral position of the object with respect to a traveling path of the first vehicle,
  a distance from the first vehicle to the second vehicle and a distance from the first vehicle to the object, and
  a velocity of the second vehicle and a velocity of the object.

4. The vehicle traveling control apparatus according to claim 3, wherein the determiner further detects, as the features quantity of each of the objects ahead of the second vehicle, a length of a trajectory of the object.

5. The vehicle traveling control apparatus according to claim 4, wherein the determiner detects the feature quantity of each of the objects ahead of the second vehicle based on image data of the objects ahead of the second vehicle, and
  wherein the feature quantity of each of the objects ahead of the second vehicle is determined for every frame of the image data.

6. The vehicle traveling control apparatus according to claim 4, wherein
  the selector chooses candidates of the third vehicle among the objects present ahead of the second vehicle based on the feature quantity, and
  the selector identifies the third vehicle from among the candidates based on the evaluation value.

7. The vehicle traveling control apparatus according to claim 4, wherein
  the selector selects as the third vehicle, one of the objects ahead of the second vehicle having the evaluation value that is highest among other objects ahead of the second vehicle.

8. The vehicle traveling control apparatus according to claim 3, wherein the determiner detects the feature quantity of each of the objects ahead of the second vehicle based on image data of the objects ahead of the second vehicle, and wherein the feature quantity of each of the objects ahead of the second vehicle is determined for every frame of the image data.

9. The vehicle traveling control apparatus according to claim 8, wherein
the selector chooses candidates of the third vehicle among the objects present ahead of the second vehicle based on the feature quantity, and
the selector identifies the third vehicle from among the candidates based on the evaluation value.

10. The vehicle traveling control apparatus according to claim 3, wherein
the selector chooses candidates of the third vehicle among the objects present ahead of the second vehicle based on the feature quantity, and
the selector identifies the third vehicle from among the candidates based on the evaluation value.

11. The vehicle traveling control apparatus according to claim 3, wherein
the selector selects, as the third vehicle, one of the objects ahead of the second vehicle having the evaluation value that is highest among other objects ahead of the second vehicle.

12. The vehicle traveling control apparatus according to claim 3, wherein the switcher seamlessly switches from the first target route while the second vehicle is present directly in front of the first vehicle to the second target route generated based on the travel trajectory of the third vehicle when the second vehicle departs from the position directly in front of the first vehicle.

13. The vehicle traveling control apparatus according to claim 2, wherein the determiner detects the feature quantity of each of the objects ahead of the second vehicle based on image data of the objects ahead of the second vehicle, and
wherein the feature quantity of each of the objects ahead of the second vehicle is determined for every frame of the image data.

14. The vehicle traveling control apparatus according to claim 13, wherein
the selector chooses candidates of the third vehicle among the objects present ahead of the second vehicle based on the feature quantity, and
the selector identifies the third vehicle from among the candidates based on the evaluation value.

15. The vehicle traveling control apparatus according to claim 2, wherein
the selector selects, as the third vehicle, one of the objects ahead of the second vehicle having the evaluation value that is highest among other objects ahead of the second vehicle.

16. The vehicle traveling control apparatus according to claim 2, wherein the switcher seamlessly switches from the first target route while the second vehicle is present directly in front of the first vehicle to the second target route generated based on the travel trajectory of the third vehicle when the second vehicle departs from the position directly in front of the first vehicle.

17. The vehicle traveling control apparatus according to claim 1, wherein
the selector selects, as the third vehicle, one of the objects ahead of the second vehicle having the evaluation value that is highest among other objects ahead of the second vehicle.

18. The vehicle traveling control apparatus according to claim 1, wherein the switcher seamlessly switches from the first target route while the second vehicle is present directly in front of the first vehicle to the second target route generated based on the travel trajectory of the third vehicle when the second vehicle departs from the position directly in front of the first vehicle.

19. The vehicle traveling control apparatus according to claim 1, wherein
the determiner detects three-dimensional objects present in front of the preceding vehicle as targets, and
the width of each of the objects is an apparent width of each of the targets at an initial detection of each of the targets after the second vehicle departs from the position directly in front of the first vehicle.

20. A vehicle traveling control apparatus comprising:
circuitry configured to
determine, while a first vehicle that is an own vehicle travels along a first target route generated based on a traveling trajectory of a second vehicle traveling directly in front of the first vehicle an evaluation value for each of objects present ahead of the second vehicle based at least on 1) a position where each of the objects is present and 2) a width of each of the objects,
identify, in response to detecting the second vehicle departing from a position directly in front of the first vehicle, a third vehicle among the objects ahead of the second vehicle based on the evaluation value for each of the objects,
generate a second target route based on a travel trajectory of the identified third vehicle,
switch from the first target route generated based on the travel trajectory of the second vehicle to the second target route to allow the first vehicle to travel along the second target route generated based on the travel trajectory of the third vehicle.

* * * * *